United States Patent [19]

Nagaoka

[11] Patent Number: 4,818,403
[45] Date of Patent: Apr. 4, 1989

[54] DOUBLE CYLINDER SCREEN

[75] Inventor: Tadayoshi Nagaoka, Kawachi, Japan

[73] Assignee: Nagaoka Kanaami Kabushiki Kaisha, Osaka, Japan

[21] Appl. No.: 946,424

[22] Filed: Dec. 24, 1986

[51] Int. Cl.$^4$ ............................................. B01D 25/04
[52] U.S. Cl. .................................. 210/488; 210/494.2; 210/499; 29/163.7; 29/902
[58] Field of Search ............... 29/163.5 R, 163.5 CN, 29/163.5 F, 34 D, DIG. 48; 210/483, 488, 490, 494.2, 499; 166/231; 52/653

[56] References Cited

U.S. PATENT DOCUMENTS

| | | | |
|---|---|---|---|
| 982,485 | 1/1911 | Everlein | 52/653 |
| 1,287,031 | 12/1918 | Johnson | 29/163.5 CW |
| 2,346,647 | 4/1944 | Bennism | 29/163.5 CW |
| 2,682,309 | 6/1954 | Banchwack | 29/163.5 CW |
| 3,101,526 | 8/1963 | Paullus et al. | 29/163.5 CW |
| 3,132,099 | 5/1964 | Eilhauer | 210/499 |
| 3,816,894 | 6/1974 | Howard et al. | 29/163.5 CW |
| 4,068,713 | 1/1978 | McGuire | 210/497.1 |
| 4,421,646 | 12/1983 | Correge et al. | 166/231 |
| 4,494,603 | 1/1985 | Hargiundey | 29/163.5 CW |
| 4,657,079 | 4/1987 | Nagouka | 166/231 |

Primary Examiner—Richard V. Fisher
Assistant Examiner—Wanda L. Millard
Attorney, Agent, or Firm—Hedman, Gibson, Costigan & Hoare

[57] ABSTRACT

A double cylinder screen comprises an inner reinforcing cylinder which performs a pressure-resisting function against an external pressure and an outer screen cylinder which performs a screen function. The inner reinforcing screen comprises inner rods disposed cylindrically at a predetermined interval in the axial direction of the screen and a spiral reinforcing member wound on the outside of the inner rods and welded to the inner rods. The outer screen cylinder comprises screen rods disposed at a predetermined interval in the axial direction on the outer periphery of the inner reinforcing member and a wire wound spirally about the outside of the screen rods and welded to the screen rods. The width of a slit of the reinforcing member is larger than the width of a slit of the wire. The double screen cylinder is improved in its stength and can be manufactured without requiring a costly jig.

9 Claims, 6 Drawing Sheets

DOUBLE CYLINDER SCREEN

BACKGROUND OF THE INVENTION

This invention relates to a screen suitable for wells such as wells of oil, water, natural gas, geothermal electric generation etc. and, more particularly, to a screen particularly useful as a deep well screen which is subject to extremely large external pressure, tension, compression and twisting forces.

A well screen used in a deep well of several hundred meters or even several thousand meters underground is required to have strength which is sufficient for resisting a large external pressure applied to the screen depending upon the structure and operation conditions of the well. As a screen satisfying such requiremnt, there has been widely used a pipe base screen which comprises a steel pipe formed with a number of round holes or slits, support rods arranged about the steel pipe in the axial direction of the pipe and a wire wound about the support rods. This pipe base screen however has the contradictory problem that, if the holes or slits are excessively formed in the steel pipe, strength of the screen against the external pressure becomes insufficient whereas, if the holes or slits are too few, the amount of take-in of fluid decreases with resulting deterioration in fluid collection efficiency. For securing sufficient strength in the use in a deep underground, the pipe base screen in some cases has to sacrifice the fluid collection efficiency.

For overcoming the problem of the pipe base screen, the applicant proposed a novel screen in Japanese Patent Publication No. 58-32275 (equivalent to U.S. Pat. No. 4,657,079). This screen comprises a reinforcing member of a generally cylindrical configuration, support rods arranged on the outside of the reinforcing member in the axial direction at a predetermined interval therebetween and a wire wound spirally on the outside of these support rods. In a section along a plain including the axis of the reinforcing member, slits continuous in the circumferential direction of the reinforcing member are formed with a predetermined pitch. The screen is capable of collecting fluid without using the pipe formed with holes or slits as in the prior art pipe base screen.

This screen disclosed in Japanese Patent Publication No. 58-32275 (hereinafter referred to as "ring base screen") having slits continuous in the circumferential direction of the reinforcing member has a higher rate of opening than the pipe base screen with resulting improvement in the fluid collection efficiency. Besides, the strength of the reinforcing member can be changed as desired by simply changing the shape of its cross section and its pitch and back-wash for preventing blocking of the slits by sand or the like is easy. The ring base screen, however, has the following problems in the manufacturing process and also in its strength under an extremely large external pressure.

In the ring base screen, the reinforcing member is formed by disposing a plurality of rings in parallel with an equal interval in the axial direction or winding a flat bar spirally. In each case, this reinforcing member is manufactured first and the support rods are arranged along the outer periphery of the reinforcing member and a wire is wound on the outside of the support rods by rotating the reinforcing member and the support rods together and the wire is welded on the support rods whereby a complete screen is obtained.

Figures 10, 11:
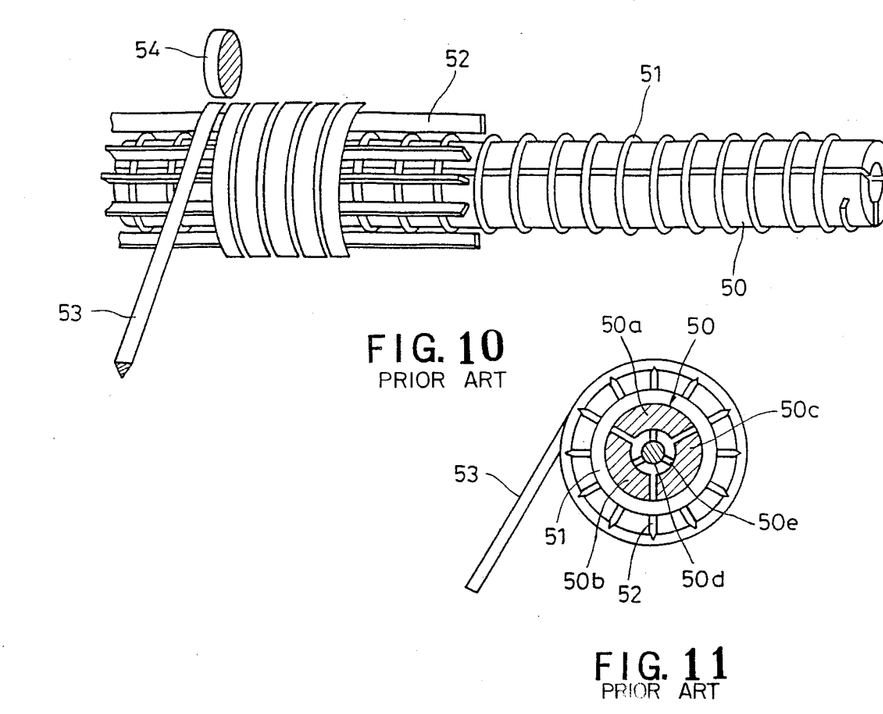
FIG. 10 is a diagram showing a process for manufacturing the prior art ring base screen.
FIG. 11 is an end view showing a structure of a jig used for the process shown in FIG. 10.

Since a well screen has a relatively large length compared to its diameter, the reinforcing member also is very long compared with its diameter. This necessitates insertion of a special jig inside of the reinforcing member during manufacture of the screen for provisionally holding the screen elements. Besides, this jig is used for transmitting power for rotating and axially feeding the reinforcing member and the support rods during winding of the wire, and this jig is essential in the manufacture of the ring base screen. This jig must be pulled off from the screen after completion of the manufacture thereof. Since, however, a strong constricting force is exerted over the entire length of the jig due to winding of the wire on the support rods, this jig must be of a special construction according to which the diameter of the jig can be reduced after completion of the screen. FIGS. 10 and 11 show a process of manufacturing the ring base screen employing such a special jig. A columnar jig 50 comprises three piece jig members 50a, 50b and 50c and a center rod 50d. The respective jig members 50a, 50b and 50c are displaceable in the radial direction by means of hydraulic jacks 50e which extend from the center rod 50d. A reinforcing member 51 is placed on this jig 50 and the jig 50 is pressed against the reinforcing member 51 by stretching the hydraulic jacks 50e. Then support rods 51 are arranged on the reinforcing member 51 and the jig 50, reinforcing member 51 and support rods 52 are fixed together by a chucking holder (not shown). Then a wire 53 is wound on the support rods 52 while imparting rotation and feed to the jig 50 and each contact point between the wire 53 and the support rods 52 is welded one after another by a welding electrode 54. After completion of the screen, the diameter of the jig 50 is reduced by withdrawing the hydraulic jacks 50e inwardly and then the jig 50 is pulled off from the screen.

The hydraulic jacks 50e are required in three places along the inner circumference of the jig 50 and the length of the jig normally is from six meters to twelve meters and, accordingly, several tens of hydraulic jacks 50e at the minimum are required in total. A hydraulic pump for applying a hydraulic pressure to the hydraulic jacks 50e must be disposed outside of the jig and hydraulic tubing must be provided from the hydraulic pump to the hydraulic jacks 50e through the inside of the jig 50. Since the jig 50 is rotating during the manufacture of the screen, the hydraulic tubing inside the jig 50 must be disconnected from the hydraulic pump during the manufacture of the screen and leakage of oil must be prevented by closing a cock of each tubing. After completion of the manufacture of the screen, the hydraulic tubing must be connected to the hydraulic pump to withdraw the hydraulic jacks for pulling out the jig 50 from the screen. Accordingly, a large number of hydraulic tubings and cocks are provided inside of the jig 50 and, besides, these must be housed in a structure adapted to the rotating jig. This requires a tremendous operation time and inevitably involves a high manufacturing cost.

The jig 50 has a limitation that it must have an inner diameter of more than about 150 mm due to the provision of the hydraulic jacks 50e and other attachments inside thereof and besides the manufacturing cost of the jig 50 is very high. Besides, the range of expansion and contraction of the jig 50 by the above described mechanism is rather limited so that jigs 50 of various diameters must be prepared in accordance with screens of various diameters with resulting increase in the manufacturing cost of the screen. Further, the operation of the jig 50 is very troublesome so that manufacture of the screen takes much time and labor.

Figure 12A:
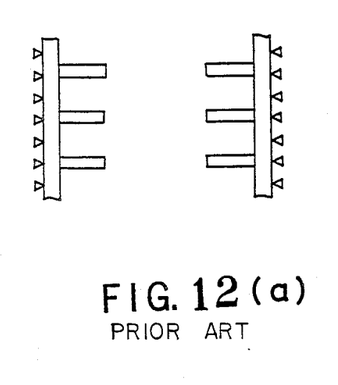
FIGS. 12(a) and 12(b) are diagrams showing states in which the reinforcing member in the prior art ring base screen is horizontally held.
Figure 12B:
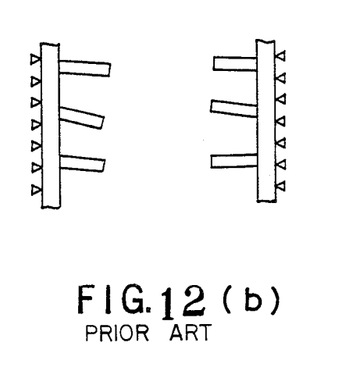

In another aspect, the prior art ring base screen has strong resistance against an external pressure equivalent to the conventional pipe base screen when the reinforcing member 51 is held horizontally (i.e., vertically with respect to the support rods 52) as shown in FIG. 12 (a) but, when an excessive external pressure is applied to it, the reinforcing member 51 can no longer maintain its horizontal posture as shown in FIG. 12 (b) and resistance to the external pressure sharply decreases.

It is, therefore, an object of the invention to provide an improved ring base screen which can be manufactured easily and at a low manufacturing cost and can be constructed with an inner diameter of less than about 150 mm and which is further improved in strength.

It is another object of the invention to provide a method for manufacturing such improved ring base screen.

SUMMARY OF THE INVENTION

The double cylinder screen achieving the above described first object of the invention is characterized in that it comprises an inner reinforcing cylinder and an outer screen cylinder provided outside of said inner reinforcing cylinder, the inner reinforcing cylinder comprising inner rods disposed cylindrically at a predetermined interval therebetween in the axial direction of the screen and a spiral reinforcing member wound with a predetermined pitch on the outside of the inner rods, the reinforcing member being welded integrally to the inner rods, and the outer screen cylinder comprising screen rods disposed at a predetermined interval therebetween in the axial direction on the outer periphery of the inner reinforcing cylinder and a wire wound spirally with a predetermined pitch about the outside of the screen rods, the wire being welded integrally to the screen rods, the width of a slit of the reinforcing member of the the inner reinforcing cylinder being larger than the width of a slit of the wire of the outer screen cylinder.

The process for manufacturing the double cylinder screen according to the invention is characterized in that it comprises steps of arranging a selected number of inner rods cylindrically at a predetermined interval therebetween on an inner welding electrode of a rotary type welder and holding one end of the inner rods, rotating the inner rods and displacing the inner rods axially while winding a reinforcing member to the inner rods in portions in which the reinforcing member and the inner rods are in contact with each other thereby forming an inner reinforcing cylinder, disposing a selected number of screen rods at a predetermined interval therebetween on the outer periphery of the inner reinforcing cylinder and holding an end of the screen rods, and rotating and axially displacing the inner reinforcing cylinder and the screen rods while winding a wire on the screen rods and welding the wire to the screen rods in portions in which the wire and the screen rods are in contact with each other thereby forming an outer screen cylinder.

According to the invention, the inner reinforcing cylinder comprising the reinforcing member and the inner rods welded integrally constitutes a strong pressure-resisting body per se so that, in manufacture of the screen, the inner reinforcing cylinder can maintain its diameter against the constricting force of the wire during the wire winding operation without the necessity of inserting the jig as in the prior art ring base screen. Accordingly, the manufacturing process is greatly simplified.

In the manufacturing process, the prior art ring base screen in which there exists no member for supporting the support rods from inside of the reinforcing member must be welded between the reinforcing member and the support rods. In contrast thereto, in the present invention, since the outer screen cylinder is pressed against the inner reinforcing cylinder by the constricting force applied during winding of the wire on the outer screen cyliner and, besides, the outer screen cylinder which is subject to the welding operation is pressed against the inner reinforcing cylinder in an expanded state due to heating of welding and thereafter is pressed against the inner reinforcing cylinder even strongly by contraction of the outer screen cylinder due to cooling, it is not necessary to weld the outer screen cylinder to the inner reinforcing cylinder. Accordingly, notwithstanding that the number of welding process required before completion of the screen is two which is the same as in the prior art ring base screen, a screen with a much greater strength than the prior art ring base screen can be obtained.

Since the inner reinforcing cylinder is of a construction in which the reinforcing member is welded to the inner rods, the reinforcing member can maintain its horizontal posture even under a very large external pressure so that the strength against the external pressure is increased as compared with the prior art ring base screen.

Since the inner reinforcing cylinder is a welded construction, elasticity and resistance against twisting force of the screen as a whole are increased so that the screen can be inserted or pulled off in a well which has a bent portion midway of the well.

Not only to a double cylinder screen, the invention is applicable to a multi-cylinder screen such as a triple cylinder screen. Thus, according to the invention, a high-strength cylindrical screen which can stand an external pressure in a deep underground of several thousand meters can be manufactured very easily.

The inner rods of the inner reinforcing cylinder function as guide members guiding tools including backwash tools in inserting and pulling out of these tools, preventing engaging of such tool with the spiral reinforcing member and damaging it.

BRIEF DESCRIPTION OF THE DRAWINGS

In the accompanying drawings.

DESCRIPTION OF PREFERRED EMBODIMENTS

Referring now to FIGS. 1 through 8, preferred embodiments of the screen according to the invention will be described.

Figure 1:
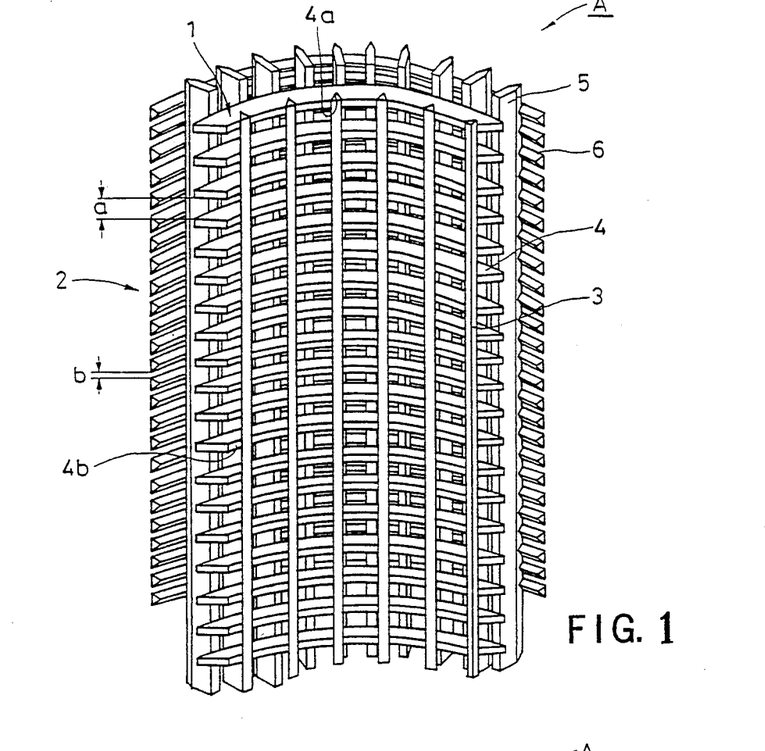
FIG. 1 is a partial perspective view of an essential portion of the double cylinder screen according to the invention.
Figure 2:
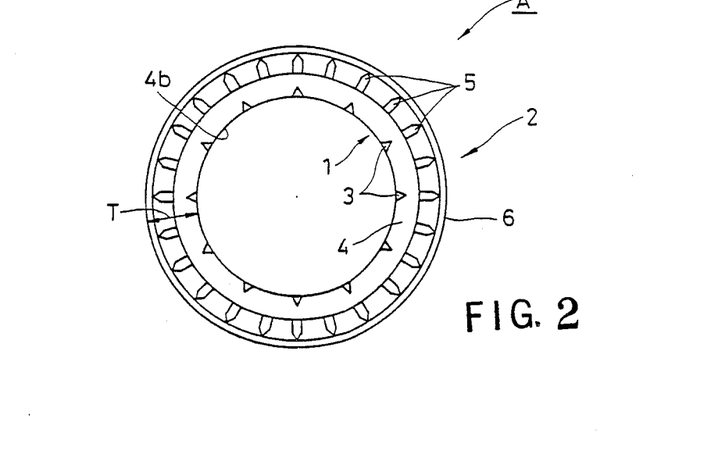
FIG. 2 is an end view showing the essential portion of the screen.

As shown in FIGS. 1 and 2, a double cylinder screen A according to the invention generally comprises an inner reinforcing cylinder 1 which performs a pressure-resisting function against an external pressure and an outer screen cylinder 2 which perfoms a screen function. The inner reinforcing cylinder comprises inner rods 3 disposed cylindrically at a predetermined interval therebetween in the axial direction of the screen A and a spiral reinforcing member 4 having an oblong cross section in which the radial length is larger than the axial length and being wound on the outside of the inner rods 3 with a predetermined pitch. The reinforcing member 4 and the inner rods 3 are welded integrally in portions in which they are in contact with each other. In this embodiment, as shown in FIG. 2, an inner surface of each of the inner rods 3 is substantially flush with the inner peripheral surface 4b of the reinforcing member 4. The reinforcing member 4 is welded to the inner rods 3 at all contact points therebetween.

An outer screen cylinder 2 comprises screen rods 5 disposed in the axial direction on the outer periphery of the inner reinforcing cylinder 1 at a predetermined interval and a wedge-wire 6 wound spirally with a predetermined pitch about the outside of these screen rods 5. This wedge-wire 6 is welded integrally to the screen rods 5 in portions in which they are in contact with each other. In this embodiment, the wedge-wire 6 is welded to the screen rods 5 at all contact points therebetween. The width of the slit a of the reinforcing member 4 of the inner reinforcing cylinder 1 is larger than the slit b of the outer screen cylinder 2.

Figure 3:
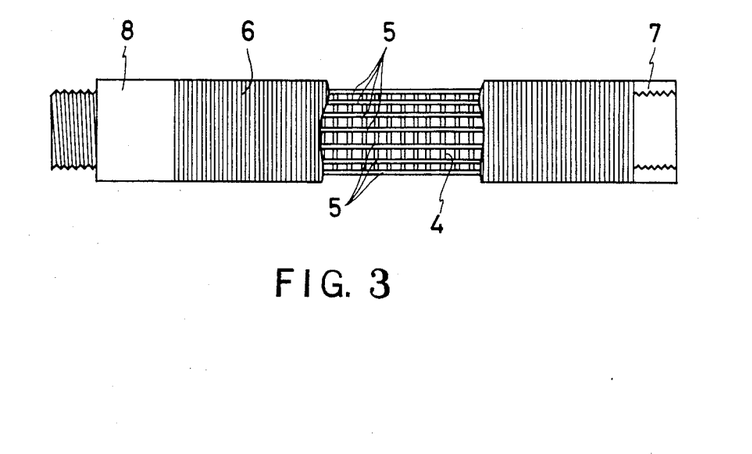
FIG. 3 is a side elevation of the screen shown with a part thereof being taken away.

This double cylinder screen A has joint portions 7 and 8 at both ends thereof as shown in FIG. 3. A plurality of screens A are connected serially to construct a well of a required length.

Figure 4:
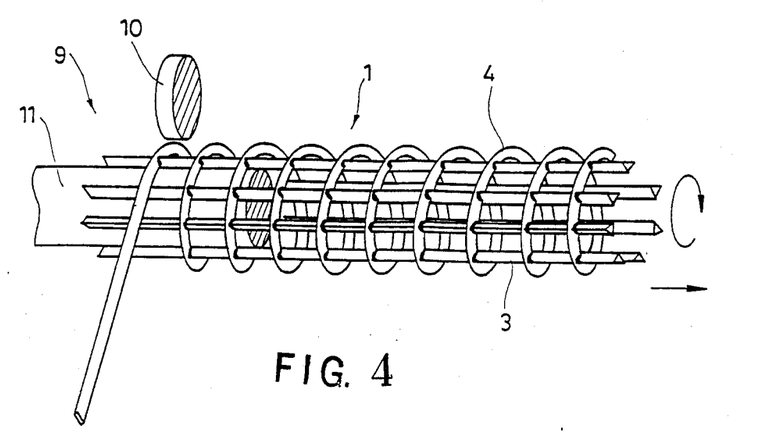
FIGS. 4 and 5 are diagrams schematically showing the process for manufacturing the double cylinder screen.
Figure 5:
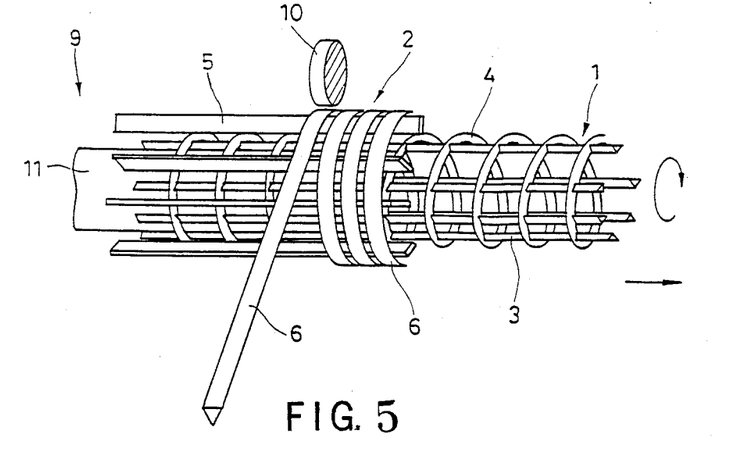
Figure 6:
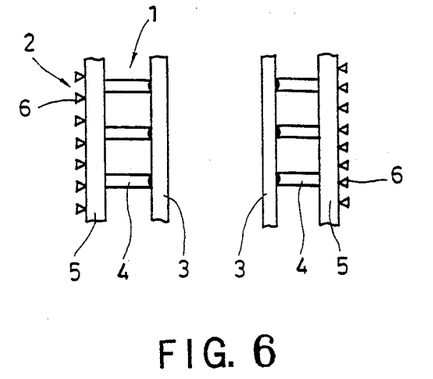
FIG. 6 is a diagram schematically showing a state in which the reinforcing member in the screen is held horizontally.

The method for producing the double cylinder screen A according to the invention will now be described with reference to FIGS. 4 and 5. FIGS. 4 and 5 schematically show the method for producing the double cylinder screen A in which illustration of both end portions of the screen A is omitted and the number of the inner rods is reduced for convenience of illustration. In FIG. 5, a right half of the outer screen cylinder 2 is omitted for convenience of illustration.

A rotary type welder 9 is of a known construction consisting of a columnar inner welding electrode 11 and a disc-like outer welding electrode 10 disposed at an end portion of the inner electrode 11. First, the inner rods 3 of a selected number are arranged cylindrically at a predetermined interval therebetween on the inner welding electrode 11 and one end of the inner rods 3 (the right end portion as viewed in FIG. 4) is held by a chucking holder (not shown). This chucking holder is rotatable and also displaceable in the axial direction of the screen A.

Next, an end portion of the reinforcing member 4 made of a flat bar is inserted between the outer welding electrode 10 and the inner rods 3. As the welder 9 is switched on, the end portion of the reinforcing member 4 is welded to the inner rods 3 in a portion in which they are in contact with each other. Then, the chucking holder and the inner welding electrode 11 are synchronously rotated in a clockwise direction while the chucking holder is displaced rightwardly as viewed in the figure with a predetermined pitch for each rotation of the electrode 11. The inner rods 3 are therefore displaced rightwardly and the reinforcing member 4 is unwound from a roll and wound spirally around the inner rods 3 disposed cylindrically on the inner welding electrode 11. As the spiral of the reinforcing member 4 is formed, contact points between the reinforcing member 4 and the inner rods 3 are welded one after another by the welder 9. The outer welding electrode 10 is rotated in a counterclockwise direction as viewed in the figure. After making the inner reinforcing cylinder 1 in this manner, the chucking holder is moved to the starting end position on the inner welding electrode 11. Then, a plurality of screen rods 5 are disposed with a predetermined interval on the outer periphery of the inner reinforcing cylinder 1 and the right end portion of the inner reinforcing cylinder 1 and the right end portion of the screen rods 5 are held by the chucking holder. Next, an end portion of a wedge wire 6 wound in the form of a roll is inserted between the outer welding electrode 10 and the screen rods 5 and the end portion of the wedge wire 6 is welded to the screen rods 5 in portions in which they are in contact with each other. Then, in the same manner as in FIG. 4, the chucking holder and the inner welding electrode 11 are rotated in synchronism with each other in a clockwise direction while the chucking holder is displaced rightwardly as viewed in the figure. This causes the inner reinforcing cylinder 1 and the screen rods 5 to be displaced rightwardly 5, disengaging from the inner welding electrode 11, and the wedge wire 6 to be fed from the roll and wound spirally on the screen rods 5. As the spiral of the wedge wire 6 is formed, the wedge wire 6 and the screen rods 6 are welded to each other in portions of contact one after another. In this manner, the outer screen cylinder 2 is formed on the outer periphery of the inner reinforcing cylinder 1. Since the outer screen cylinder 2 is pressed against the inner reinforcing cylinder 1 by the constricting force applied during winding of the wedge wire 6 on the outer screen cylinder 2 and, besides, the outer screen cylinder 2 which is subject to the welding operation is pressed against the inner reinforcing cylinder in an expanded state due to heating of welding and thereafter is pressed against the inner reinforcing cylinder 1 due to cooling, it is not necessary to weld the outer screen cylinder to the inner reinforcing cylinder.

After forming the outer secreen cylinder 2 on the outer periphery of the inner reinforcing cylinder 1, the entire cylinder assembly is disengaged from the chucking holder and joints 7 and 8 are secured to both ends of the cylinder assembly by welding as shown in FIG. 3 whereby the double screen cylinder A according to the invention is completed.

The operation of the double screen cylinder of the above described construction will now be described.

In a case where the screen A is used for collecting petroleum, water or other fluid, the fluid flows into the cylinder from the slit b of the wedge wire 6 of the outer screen cylinder 2 through the slit a of the reinforcing member 4 of the inner reinforcing cylinder 1 and collected to the outside. Since the slit a of the reinforcing member 4 is larger than the slit b of the wedge wire 6, the fluid is taken in the screen A with least resistance. When the opening rate has decreased due to blocking by sand or the like, the screen A can be cleaned by back-wash, i.e., flowing of fluid in reverse direction form the inside to the outside of the screen A. This back-wash also can be performed efficiently as the slit a is larger than the slit b.

Since the reinforcing member 4 is welded integrally to the inner rods 3, the reinforcing member 3 can maintain its horizontal posture even under a strong external pressure (FIG. 6) so that the screen A can resist a large external pressure. Further, since the distance between the inner peripheral surface of the inner rods 3 and the outer peripheral surface of the wedge wire 6 (T in FIG. 2) imparts resistance to external pressure which is equivalent to that imparted by the thickness of a steel pipe for construction uses. Besides, the screen A exhibits a very strong resistance to twisting force.

Figure 7:
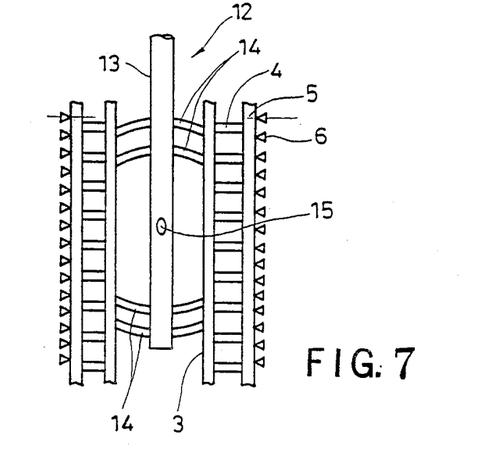
FIGS. 7 and 8 are diagrams schematically showing back-wash tools.
Figure 8:
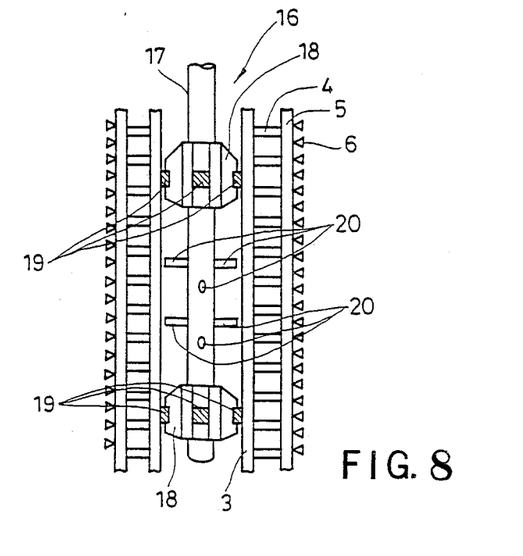

Back-wash of the screen A is usually performed by using a known back-washing tool as shown in FIG. 7 or FIG. 8. The back-wash tool 12 shown in FIG. 7 is made by attaching rubber wash caps 14 to a pipe 13. For back-washing, water is ejected from a wash port 15 of the pipe 13 while the pipe 13 is vertically moved. The back-wash tool 16 shown in FIG. 8 is made by attaching positioning members 18 having blades 19 to a pipe 17 and back-wash is performed by ejecting water from nozzles 20 provided on the pipe 17. Whichever tool may be used, the inner rods 3 of the double cylinder screen A function as guide members for the wash caps 14 or the blades 19 to enable smooth insertion and pulling out of the back-wash tool 12 or 16.

The screen 5 need not necessarily be of a cross section as shown in FIG. 1 but any cross section such as oblong, ecliptical and I-shaped may be used.

A wedge wire is preferably used as the wire 6 but the wire 6 is not limited to the wedge wire.

The reinforcing member 4 in the above described embodiment is of an oblong cross section in which the radial length is larger than the axial length. The shape of the reinforcing member 4 is not limited to this but other cross sections such as I-shape, wedge shape and ecliptical shape may be used. It is preferable that the reinforcing member 4 is larger in its radial length than in its axial length but the cross section of the reinforcing member 4 is not limited to this. A square cross section may for example be used. As the inner rods 3, rods of a triangular cross section are used in the above described embodiment. Other cross section such as a circular one may also be used. In the above described embodiment, the inner side of the inner rods 3 is flush with the inner peripheral surface of the reinforcing member 4. This arrangement is particularly useful for smooth insertion and pulling out of the back-wash tool. The inner rods 3 may however be welded to the reinforcing member 4 with their inner side projecting inwardly of the inner peripheral surface 4b of the reinforcing member 4.

In the above embodiment, the reinforcing member 4 and the inner rods 3 of the inner reinforcing cylinder 1 are welded to each other in all portions in which they are in contact with each other and the wedge wire 6 and the screen rods 5 of the outer screen cylinder 2 are welded to each other in all portions in which they are in contact with each other. This structure is particularly preferable because the inner reinforcing cylinder 1 and the outer screen cylinder 2 become respectively very rigid structures. Depending upon conditions of use of the screen, however, these members may be welded not in all portions in which they are in contact with each other but, for example, in every other contact portion. As described above, the outer screen cylinder 2 is pressed against the inner reinforcing cylinder 1 in the manufacturing process so that the cylinders 1 and 2 need not be welded to each other. The cylinders 1 and 2 may however be welded to each other depending upon conditions of use of the screen.

Figure 9:
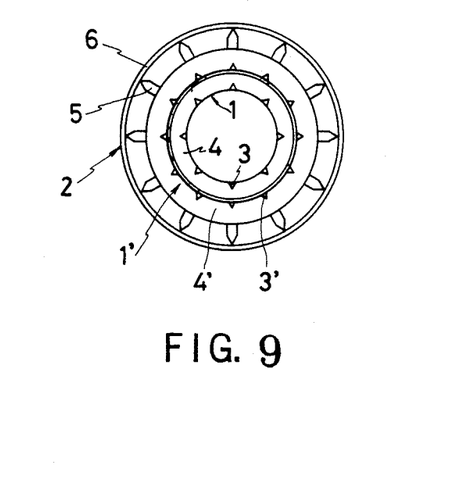
FIG. 9 is an end view showing a triple cylinder screen incorporating the invention.

The method for manufacturing the double cylinder screen according to the invention may be applicable in a process for manufacturing a multi-cylinder screen such as a triple cylinder screen. For example, as shown in FIG. 9, a primary inner reinforcing cyliner 1 consisting of inner rods 3 and a reinforcing member 4 is formed and then a secondary inner reinforcing cylinder 1' is formed in the same manner on the outer periphery of the primary inner reinforcing cylinder 1. Finally, an outer screen cylinder 2 consisting of screen rods 5 and a wedge wire 6 is formed on the outer periphery of the secondary inner reinforcing cylinder 1' whereby a triple cylinder screen which is stronger than the double cylinder screen can be obtained. As to materials used for the screen members, any suitable materials including metal, plastics and glass fiber may be selectively used.

What is claimed is:

1. A double cylinder screen assembly having no internal extraction pipe comprising an inner cylindrical major pressure resistant member and a cylindrical outer screen member, said inner pressure resistant member comprising:
   radially spaced-apart inner rods extending in the axial direction of the double cylinder screen; and
   spiral reinforcing means wound at a predetermined pitch on the outside surface of said inner rods, said spiral reinforcing means including axially spaced-apart turns defining a plurality of first openings, wherein portions of said spiral reinforcing means are affixed to portions of said inner rods,
   radially spaced-apart screen rods extending in the axial direction of the double cylinder screen and in pressure contact with the outer surface of the spiral reinforcing means of said inner pressure resistant member; and
   wire means spirally wound at a predetermined pitch on the outside surface of said screen rods and including axially spaced-apart turns defining a plurality of second openings, wherein portions of said wire means are affixed to portions of said screen rods,
   wherein the width of said first openings are larger than the width of said second openings.

2. The double cylinder screen of claim 1, wherein said inner rods have a face adapted to contact a corresponding inner face of said spiral reinforcing means.

3. The double cylinder screen of claim 1, wherein said spiral reinforcing means has a cross-section dimension in which the radial length is greater than the axial length.

4. The double cylinder screen of claim 1, wherein the affixed portions of the spiral reinforcing means and the inner rods are welded to each other.

5. The double cylinder screen of claim 1, wherein the affixed portions of the wire means and the screen rods are welded to each other.

6. A method of manufacturing a double cylinder screen comprising:
arranging a plurality of inner rods in radial spaced-apart relationship at a predetermined interval therebetween on an inner welding electrode of a rotary type welder and holding one end of the inner rods;
rotating said inner rods and displacing said inner rods axially while winding a reinforcing means about said inner rods thereby forming axially spaced-apart turns defining first openings;
affixing said reinforcing means to said inner rods at the points of contact of said reinforcing means and said inner rods to thereby form an inner major pressure resistant member;
arranging a plurality of screen rods in radially spaced-apart relationship at a predetermined interval therebetween on the outer surface of said inner pressure resistant member and holding an end of said screen rods; and
rotating and axially displacing said inner pressure resistant member and said screen rods while winding a wire means about said screen rods to form axial spaced-apart turns defining second openings;
affixing said wire means to said screen rods at points of contact of said wire means and said screen rods to thereby form an outer screen member.

7. The method of claim 6, wherein the step of affixing the reinforcing means and the inner rods comprises welding the reinforcing means and inner rods to each other.

8. The method of claim 6, wherein the step of affixing the wire means to the screen rods comprises welding the wire means and the screen rods to each other.

9. The method of claim 6, wherein the width of the first openings are greater than the width of the second openings.

* * * * *